United States Patent
Rambo

(10) Patent No.: US 11,859,539 B2
(45) Date of Patent: Jan. 2, 2024

(54) AIRCRAFT PROPULSION SYSTEM WITH INTER-TURBINE BURNER

(71) Applicant: General Electric Company, Schenectady, NY (US)

(72) Inventor: Jeffrey Douglas Rambo, Mason, OH (US)

(73) Assignee: General Electric Company, Schenectady, NY (US)

(*) Notice: Subject to any disclaimer, the term of this patent is extended or adjusted under 35 U.S.C. 154(b) by 27 days.

(21) Appl. No.: 17/163,681

(22) Filed: Feb. 1, 2021

(65) Prior Publication Data

US 2022/0243667 A1    Aug. 4, 2022

(51) Int. Cl.

| F02C 3/14 | (2006.01) |
|---|---|
| F02C 9/40 | (2006.01) |
| F02C 3/06 | (2006.01) |
| F02C 3/22 | (2006.01) |
| F02C 3/24 | (2006.01) |
| F02C 7/22 | (2006.01) |
| F02C 6/00 | (2006.01) |
| F02C 3/16 | (2006.01) |

(52) U.S. Cl.
CPC ............... *F02C 3/14* (2013.01); *F02C 3/06* (2013.01); *F02C 3/22* (2013.01); *F02C 3/24* (2013.01); *F02C 6/003* (2013.01); *F02C 7/22* (2013.01); *F02C 9/40* (2013.01); *F02C 3/16* (2013.01); *F05D 2220/323* (2013.01); *F05D 2270/02* (2013.01); *F05D 2270/024* (2013.01); *F05D 2270/051* (2013.01)

(58) Field of Classification Search
CPC ........... F05D 2220/323; F05D 2270/02; F05D 2270/024; F05D 2270/051; F02C 3/14; F02C 3/06; F02C 3/22; F02C 3/24; F02C 6/003; F02C 7/22; F02C 9/40; F02C 3/16
See application file for complete search history.

(56) References Cited

U.S. PATENT DOCUMENTS

| 3,093,968 A | * | 6/1963 | Osofsky | F02C 7/27 |
| | | | | 60/39.19 |
| 5,577,378 A | | 11/1996 | Althaus et al. | |

(Continued)

FOREIGN PATENT DOCUMENTS

| EP | 2725302 A1 | 4/2014 | |
| EP | 3486569 A | 5/2019 | |
| FR | 1006682 A | * 2/1942 | ......... H04B 10/0771 |

*Primary Examiner* — Jason H Duger
(74) *Attorney, Agent, or Firm* — Dority & Manning, P.A.

(57) ABSTRACT

An aircraft propulsion system and computing system are provided. The propulsion system includes a low pressure (LP) spool and a core engine having a high pressure (HP) spool. A frame is positioned in serial flow arrangement between an HP turbine and an LP turbine. The frame includes an inter-turbine burner including a strut forming an outlet opening into a core flowpath of the propulsion system. A first fuel system is configured to flow a liquid fuel to a combustion section for generating first combustion gases. A second fuel system is configured to flow a gaseous fuel to the core flowpath via the inter-turbine burner for generating second combustion gases. The propulsion system forms a rated power output ratio of the core engine and the inter-turbine burner with the LP spool between 1.5 and 5.7.

20 Claims, 4 Drawing Sheets

(56) References Cited

U.S. PATENT DOCUMENTS

| | | | |
|---|---|---|---|
| 6,981,358 B2 | 1/2006 | Bellucci et al. | |
| 7,603,863 B2* | 10/2009 | Widener | F23R 3/20 |
| | | | 415/114 |
| 8,375,723 B2* | 2/2013 | Benz | F25J 3/04575 |
| | | | 60/39.463 |
| 9,097,184 B2 | 8/2015 | Stryapunin et al. | |
| 9,366,184 B2* | 6/2016 | Bunker | F23R 3/18 |
| 9,599,017 B2* | 3/2017 | Joshi | F02C 3/34 |
| 9,708,977 B2 | 7/2017 | Woodall et al. | |
| 9,976,744 B2 | 5/2018 | Wood et al. | |
| 2006/0272331 A1* | 12/2006 | Bucker | F02C 3/34 |
| | | | 60/774 |
| 2007/0033945 A1 | 2/2007 | Goldmeer et al. | |
| 2012/0260665 A1* | 10/2012 | Eroglu | F23R 3/286 |
| | | | 60/774 |
| 2012/0304660 A1* | 12/2012 | Kupratis | F23R 3/346 |
| | | | 60/722 |
| 2014/0271117 A1* | 9/2014 | Armstrong | F01D 21/12 |
| | | | 415/13 |
| 2016/0169519 A1 | 6/2016 | Davis, Jr. et al. | |
| 2017/0030582 A1* | 2/2017 | Razak | F23R 3/50 |
| 2019/0383221 A1* | 12/2019 | Du | B64D 31/06 |

\* cited by examiner

AIRCRAFT PROPULSION SYSTEM WITH INTER-TURBINE BURNER

FIELD

The present subject matter relates generally to aircraft propulsion systems. The present subject matter relates particularly to structures and methods for engine operation for aircraft propulsion systems.

BACKGROUND

Conventional aircraft propulsion systems are generally configured to generate all levels of thrust from combustion gases from a combustion system positioned between a high pressure compressor (HPC) and a high pressure turbine (HPT). Accordingly, the size of the HPC, the combustion system, and the HPT are directed to generating the entire range of thrust output or maximum thrust output.

Some propulsion systems include reheat systems, such as augmenters or afterburners, to generate increased amounts of thrust. However, such systems are generally inefficient with regard to fuel consumption, and such systems further generate amounts of emissions or noise that exceed regulated levels of emissions and noise, such as commercial and general aviation aircraft. Reheat systems for non-aircraft gas turbine engines, such as industrial gas turbines for power generation, do not require consideration for propulsive efficiency and overall aircraft weight, performance, and efficiency.

As such, there is a need for an improved aircraft propulsion system that can generate large amounts of thrust without adversely affecting emissions output and fuel consumption.

BRIEF DESCRIPTION

Aspects and advantages of the invention will be set forth in part in the following description, or may be obvious from the description, or may be learned through practice of the invention.

An aspect of the present disclosure is directed to an aircraft propulsion system. The propulsion system includes a low pressure (LP) spool including a fan section, a LP compressor, and an LP turbine. A core engine includes a high pressure (HP) compressor, a combustion section, and an HP turbine. The HP compressor and the HP turbine together form a rotatable HP spool. A frame is positioned in serial flow arrangement between the HP turbine and the LP turbine. The frame includes an inter-turbine burner including a strut forming an outlet opening into a core flowpath of the propulsion system. A first fuel system includes a first fuel conduit in fluid communication with a fuel nozzle at the combustion section and is configured to flow a liquid fuel to the combustion section for generating first combustion gases. A second fuel system includes a second fuel conduit in fluid communication with the core flowpath via the outlet opening at the inter-turbine burner and is configured to flow a gaseous fuel to the core flowpath for generating second combustion gases. The LP compressor, the HP compressor, the combustion section, the HP turbine, the inter-turbine burner, and the LP turbine are in serial flow arrangement. The propulsion system forms a rated power output ratio of the core engine and the inter-turbine burner with the LP spool between 1.5 and 5.7.

Another aspect of the present disclosure is directed to a computing system for an aircraft propulsion system. The computing system includes one or more processors and one or more memory, wherein the memory is configured to store instructions that, when executed by the processor, cause the propulsion system to perform operations. The operations include flowing liquid fuel to a combustion section of the propulsion system; generating first combustion gases at the combustion section corresponding to 85% or less of a rated power output of the propulsion system; and modulating rotational speed of the LP spool via modulating a flow of gaseous fuel to an inter-turbine burner to generate second combustion gases.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
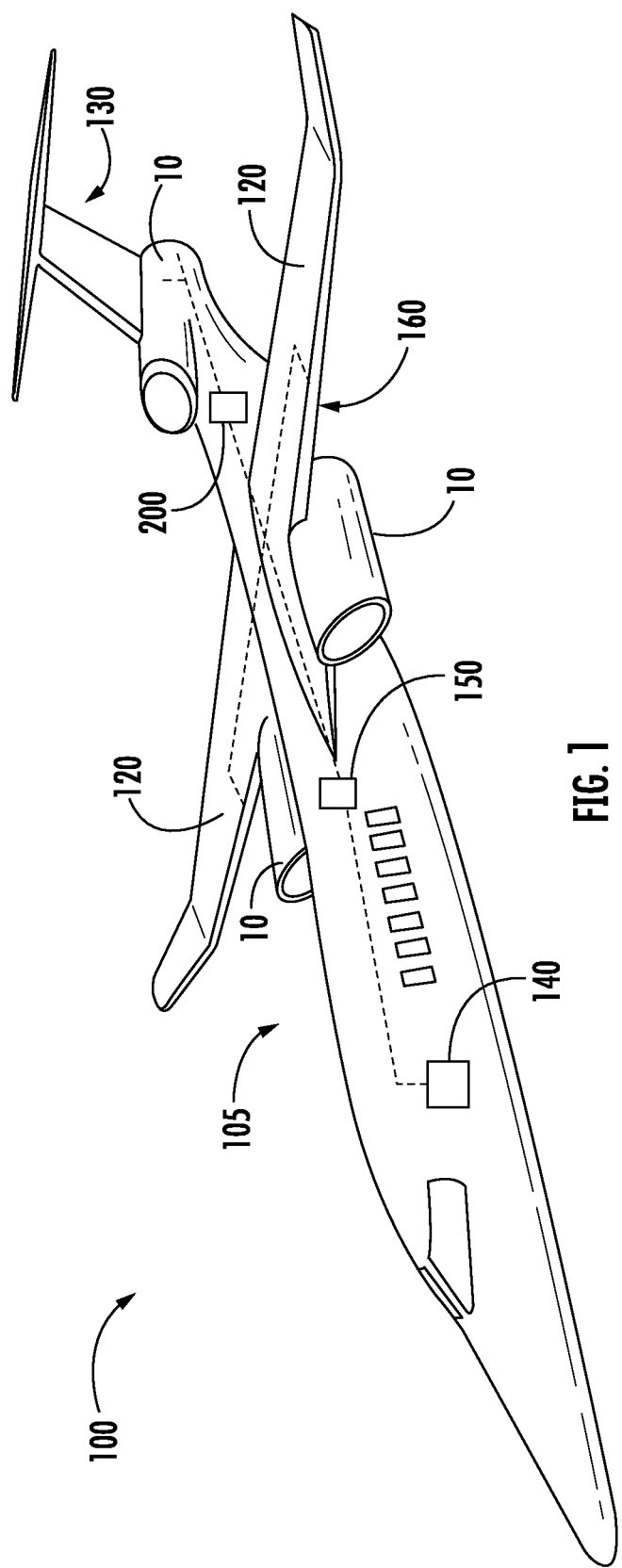
FIG. 1 is an exemplary embodiment of an aircraft including a propulsion system in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of an aircraft and propulsion system are provided that include an inter-turbine reheat burner positioned between a first turbine and a second turbine. A first fuel system provides a liquid fuel to a combustion section to generate combustion gases to the turbines. A second fuel system provides a gaseous fuel to the inter-turbine burner to selectively generate reheat gases based on particular engine or aircraft operating conditions. Embodiments of the propulsion system are further configured to generate particular ratios of thrust or power output based on the first fuel system versus the first fuel system and second fuel system together.

Embodiments of the propulsion system and aircraft provided herein allow for relatively smaller core engine sizes (i.e., the size and power output of the high pressure spool, the combustion section, and the high pressure turbine together) while generating rated power outputs similar to larger core engine sizes, via increased power extraction from the low pressure spool. Smaller core engine sizes allow for reduced fuel consumption, reduced emissions, greater bypass ratios and improved specific fuel consumption. Smaller core engine sizes may also allow for operating the propulsion system as an auxiliary power unit (APU) to power aircraft subsystems, electronics, or provide engine starting power to other propulsion systems, without the use of dedicated APUs separate from the propulsion system. Such systems allow for improving overall aircraft efficiency, such as by removing a need or desire for non-propulsion gas turbine engines.

Referring now to the drawings, in FIG. 1, an exemplary embodiment of a vehicle 100 including a propulsion system 10 with an inter-turbine burner according to aspects of the present disclosure is provided. In an embodiment, the vehicle 100 is an aircraft including an aircraft structure or airframe 105. The airframe 105 includes a fuselage 110 to which wings 120 and an empennage 130 are attached. The propulsion system 10 according to aspects of the present disclosure is attached to one or more portions of the airframe. In various embodiments, the aircraft 100 includes a thermal management system 200 configured to desirably distribute thermal loads, such as to add or remove heat from one or more fluids or structures, such as, but not limited to, oxidizer at the propulsion system, fuel, lubricant, hydraulic fluid, pneumatic fluid, or cooling fluid for an electric machine, electronics, computing system, environmental control system, gear assembly, or other system or structure.

In still various embodiments, the aircraft 100 includes sub-systems generally defining an electric load requiring input energy. Such systems include an anti-icing system 160, an environmental control system 150, and an avionics system 140. The propulsion system 10 is configured to extract energy from one or more spools to power the aircraft sub-systems, such as described herein. Although certain systems may be formed as mechanical systems, electrification of the systems may reduce aircraft weight and complexity. However, such electrification generally requires greater energy inputs, such as from the propulsion system 10 described herein.

In certain instances, the propulsion system 10 is attached to an aft portion of the fuselage 110. In certain other instances, the propulsion system 10 is attached underneath, above, or through the wing 120 and/or portion of the empennage 130. In various embodiments, the propulsion system 10 is attached to the airframe 105 via a pylon or other mounting structure. In still other embodiments, the propulsion system 10 is housed within the airframe, such as may be exemplified in certain supersonic commercial aircraft.

Figure 2:
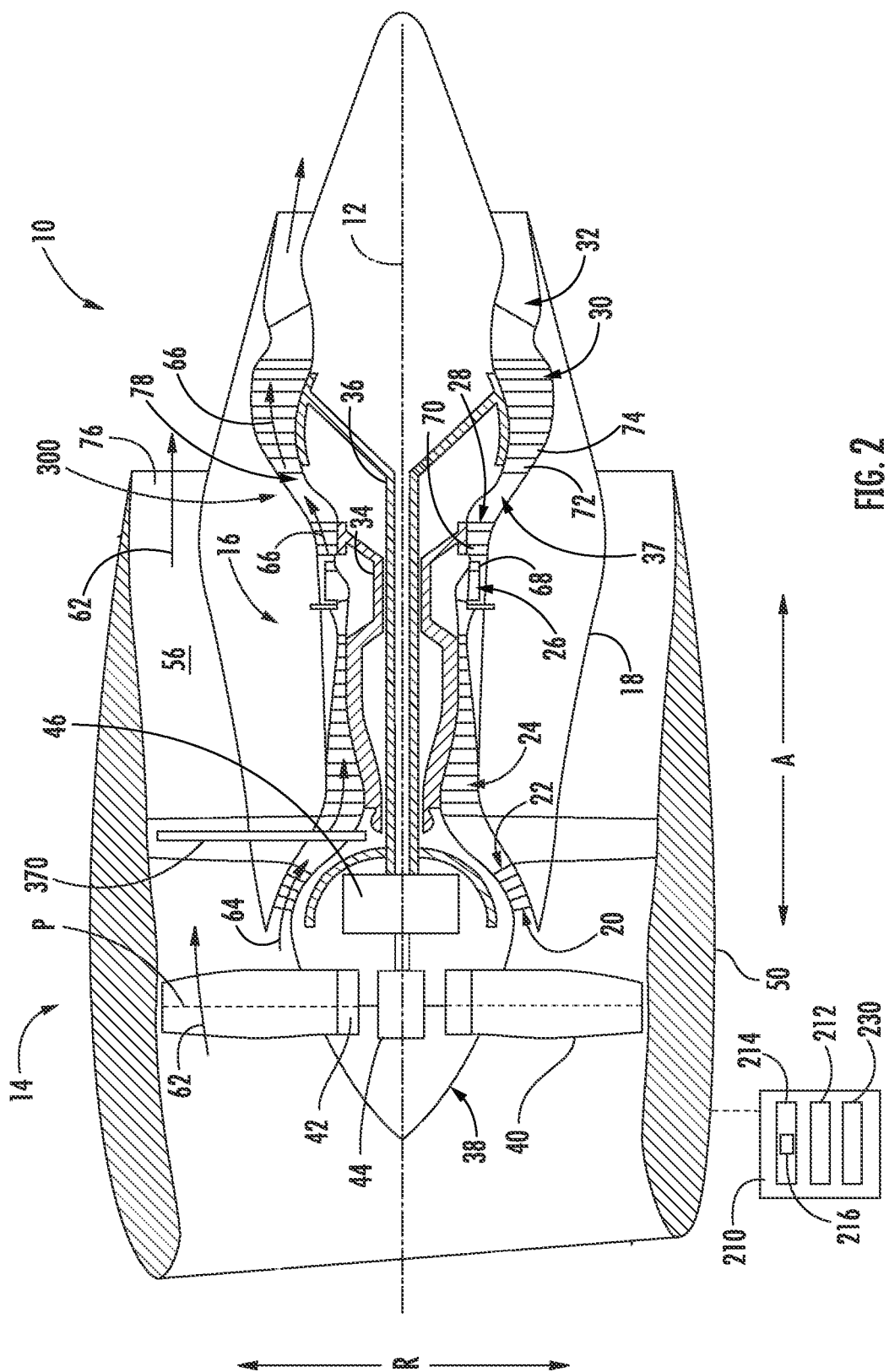
FIG. 2 is a schematic cross-sectional view of a propulsion system for the aircraft of FIG. 1 in accordance with aspects of the present disclosure.

Referring now to FIG. 2, a schematic cross-sectional view of a propulsion system for the aircraft in accordance with an exemplary embodiment of the present disclosure is provided. As shown in FIG. 2, the propulsion system 10 defines an axial direction A (extending parallel to a longitudinal centerline 12 provided for reference), a radial direction R, and a circumferential direction (i.e., a direction extending about the axial direction A; not depicted). In various embodiments, the propulsion system 10 is configured as a gas turbine engine, such as a turbofan engine. In particular embodiments, the propulsion system 10 is a ductless open-rotor engine (i.e., without a nacelle surrounding the fan blades). In general, the propulsion system 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16.

In certain embodiments, the propulsion system 10 includes one or more electric machines 370 operably coupled to a spool of the engine. The electric machine 370 may be operably coupled to the HP spool, the LP spool, or both, to extract or receive energy from the spool during operation. Additionally, the electric machine 370 may be configured to output or discharge energy to the spool to start or aide rotation of the HP spool (e.g., during startup or other desired operation), or to the LP spool during desired operation of the aircraft (e.g., during cruise operation, or transient conditions, or for relative bursts of thrust or power output). In various embodiments described herein, the HP spool may be allowed to operate at a substantially steady-state condition, such as to allow for substantially steady-state extraction of energy to the electric machine. The electric machine may discharge energy to one or more sub-systems (e.g., sub-systems 140, 150, 160) at the aircraft 100. Particularly, embodiments of the propulsion system 10 provided herein allow for increased energy extraction from the HP spool. Still further, or alternatively, the system 10 may allow for power extraction during ground operation conditions, including ground idle or taxiing conditions.

In a particular embodiment, such as depicted in FIG. 2, the fan section 14 may include a variable pitch fan 38. The turbomachine 16 is operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

Referring still to FIG. 2, the compressed second portion of air 64 from the compressor section mixes with liquid fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16. Simultaneously, the pressure of the first portion of air 62 is substantially increased as the first portion of air 62 is routed through the bypass airflow passage 56 before it is exhausted from a fan nozzle exhaust section 76 of the propulsion system 10, also providing propulsive thrust. The HP turbine 28, the LP turbine 30, and the jet exhaust nozzle section 32 at least partially define a hot gas path 78 for routing the combustion gases 66 through the turbomachine 16.

It will be appreciated that the exemplary propulsion system 10 depicted in FIG. 2 is a relatively large power class turbofan propulsion system 10. Accordingly, when operated at the rated speed, the propulsion system 10 may be configured to generate a relatively large amount of thrust. More specifically, when operated at the rated speed, the propulsion system 10 may be configured to generate at least about 14,000 pounds of thrust, or at least 18,000 pounds of thrust, or at least 21,000 pounds of thrust, or at least 24,000 pounds of thrust, or at least 30,000 pounds of thrust. Certain embodiments may generate up to 120,000 pounds of thrust at the rated speed. Accordingly, the propulsion system 10 depicted in FIG. 2 may be referred to as a relatively medium-to-large power class gas turbine engine.

It will be appreciated that other exemplary embodiments of the propulsion system 10 are relatively large power class turboshaft propulsion system 10. Accordingly, when operated at the rated speed, the propulsion system 10 may be configured to generate a relatively large amount of horsepower. More specifically, when operated at the rated speed, the propulsion system 10 may be configured to generate up to 10,000 shaft horsepower (shp). In various embodiments, when operated at the rated speed, the propulsion system 10 may be configured to generate at least 2,000 shaft horsepower (shp).

Moreover, it should be appreciated that the exemplary propulsion system 10 depicted in FIG. 2 is by way of example only, and that in other exemplary embodiments, the propulsion system 10 may have any other suitable configuration. For example, in certain exemplary embodiments, the fan may not be a variable pitch fan. Additionally, or alternatively, aspects of the present disclosure may be utilized with any other suitable aeronautical gas turbine engine, such as a turboshaft engine, turboprop engine, turbojet engine, etc. Further embodiments may omit the nacelle surrounding the fan blades, such as to form an open-rotor turbofan engine.

It should be appreciated that, as used herein, rotation and modulation of speed of the HP spool and the LP spool correspond to generation and modulation of output torque, power, or thrust. In turbofan configurations of the propulsion system, the substantial majority portion of thrust is generated via rotation of the fan blades via the LP spool. In various embodiments, a remaining portion of thrust is generated via combustion gases exhausted through the exhaust jet nozzle.

Figure 3:
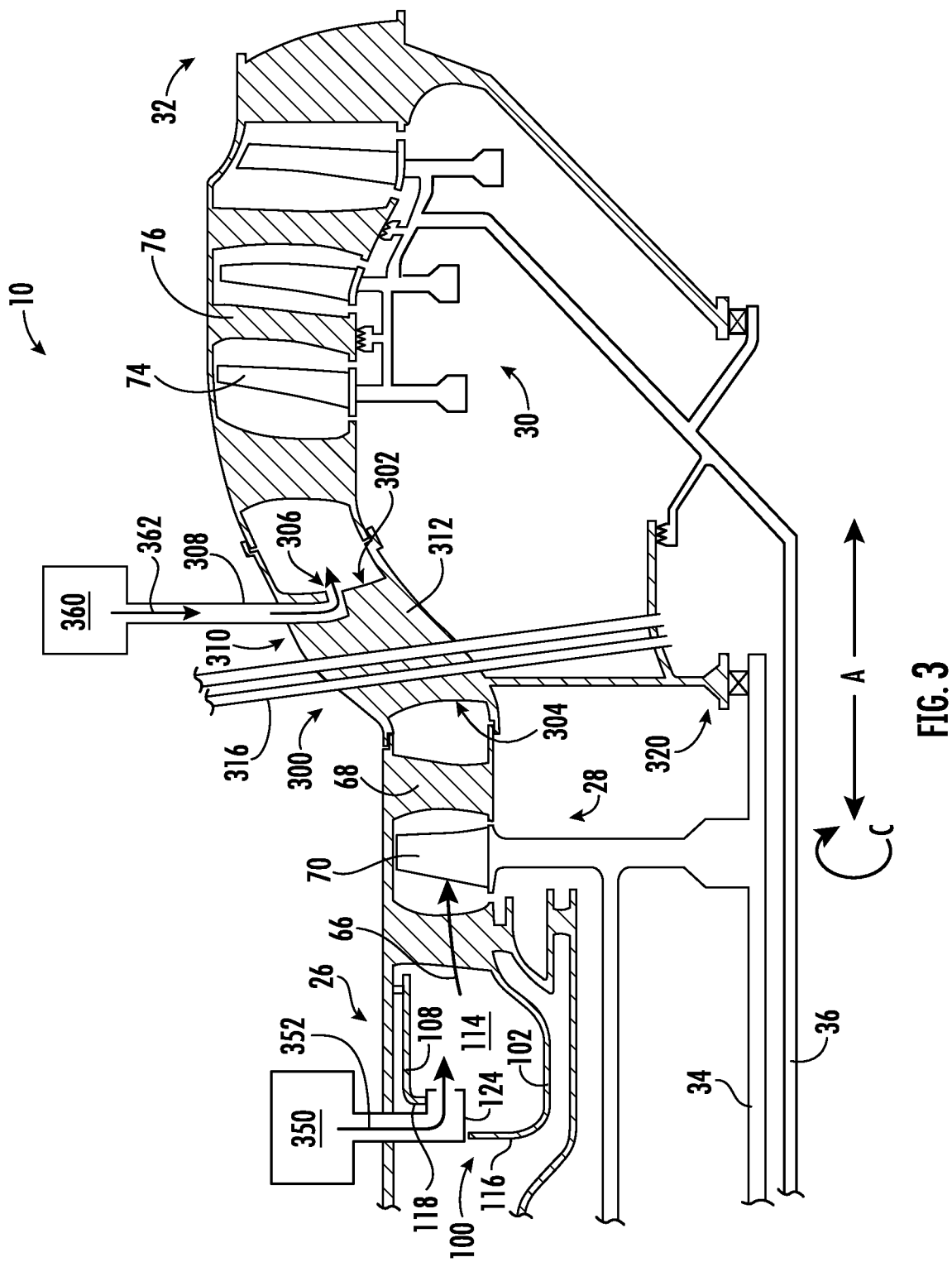
FIG. 3 is a schematic cross-sectional view of a portion of the propulsion system including an embodiment of an inter-turbine burner in accordance with aspects of the present disclosure.
Figure 4:
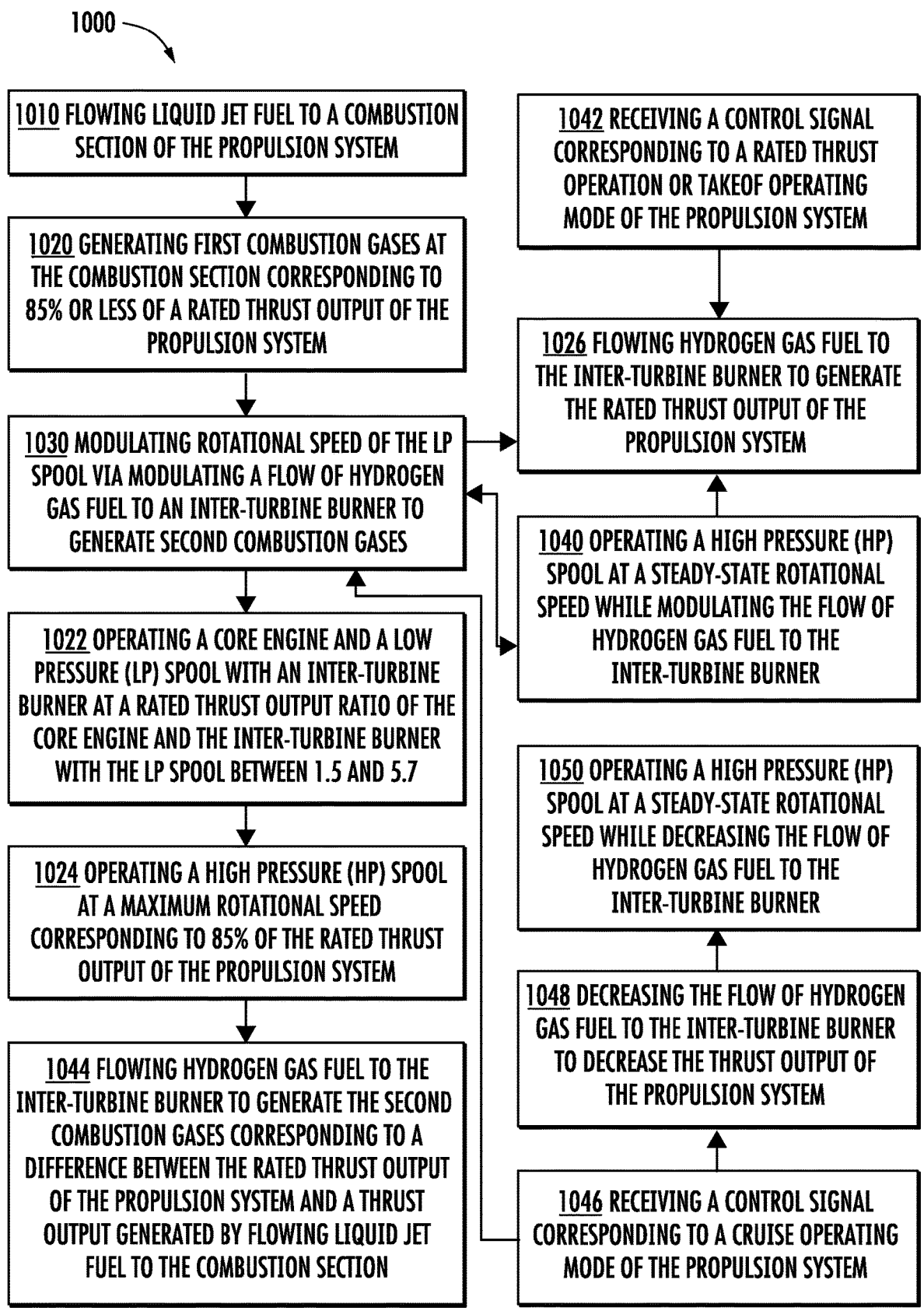
FIG. 4 is a flowchart outlining steps of a method for operating a propulsion system in accordance with aspects of the present disclosure.

Referring now to FIG. 3, a close-up view of a portion of the exemplary propulsion system 10 of FIG. 2 is provided. More specifically, FIG. 3 provides a close-up view of the combustion section 26 and the turbine section. In a particular embodiment, the combustion section 26 includes a combustor assembly 100. The combustor assembly 100 may be configured as a deflagrative combustor assembly, such as, but not limited to, an annular combustor, a dual-annular combustor, a can-annular combustor, a can combustor, a trapped vortex combustor, or other appropriate combustion system. The combustor assembly may be configured as a lean-burn combustor, a rich-burn combustor, a rich quench lean (RQL) combustor, or other appropriate combustor assembly.

In one embodiment, the combustion section 26 includes a first fuel conduit, such as formed by one or more fuel nozzles 124 configured to receive a flow of liquid fuel, depicted schematically via arrows 352, and provide the liquid fuel to a combustion chamber 114 for combustion or detonation. Although not depicted in further detail, the fuel nozzle 124 may be any appropriate type of fuel injector, nozzle, rail, or other liquid fuel dispensing device, atomizing device, or mixing device. In particular embodiments, the fuel nozzle 124 may be configured for lean or rich mixtures, combustion, or detonation.

In certain embodiments, the combustor assembly 100 generally includes an inner liner 102 extending between an aft end and a forward end generally along the axial direction A, as well as an outer liner 108 also extending between an aft end and a forward end generally along the axial direction A. The inner and outer liners 102, 108 together at least partially define a combustion chamber 114 therebetween. The inner and outer liners 102, 108 are each attached to or formed integrally with an annular dome. More particularly, the annular dome includes an inner dome section 116 formed integrally with the forward end 106 of the inner liner 102 and an outer dome section 118 formed generally with the forward end of the outer liner 108. Further, the inner and outer dome section 116, 118 may each be formed integrally (or alternatively may be formed of a plurality of components attached in any suitable manner) and may each extend along the circumferential direction C to define an annular shape.

It should be appreciated, however, that in other embodiments, the combustor assembly 100 may not include the inner and/or outer dome sections 116, 118; may include separately formed inner and/or outer dome sections 116, 118 attached to the respective inner liner 102 and outer liner 108; or may have any other suitable configuration. In still other embodiments, the combustion section 26 may be configured as a detonative combustion system, such as a rotating detonation combustion system or a pulse detonation combustion system.

Referring still to FIG. 3, the combustor assembly 100 further includes a plurality of fuel air mixers spaced along the circumferential direction C (not shown) and positioned at least partially within the annular dome. More particularly, the plurality of fuel air mixers are disposed at least partially between the outer dome section 118 and the inner dome section 116 along the radial direction R. Compressed air from the compressor section of the propulsion system 10 flows into or through the fuel air mixers, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 may include an outer cowl at a forward end and the inner dome section 116 similarly includes an inner cowl at a forward end. The outer cowl and inner cowl may assist in directing the flow of compressed air from the compressor section into or through one or more of the fuel air mixers. Again, however, in other embodiments, the annular dome may be configured in any other suitable manner.

Certain embodiments of the combustion section 26 or the turbine section may include one or more components formed of a ceramic matrix composite (CMC) material. In certain embodiments, the inner liner 102 and the outer liner 108 are each formed of CMC material. In still certain embodiments, vanes or struts of the frame 300 further described below are formed of CMC material. Still further embodiments include one or more stages of vanes or blade of the LP turbine 30 formed of CMC material. CMC material is a non-metallic material having high temperature capability. Exemplary CMC materials utilized for such components may include silicon carbide (SiC), silicon nitride, or alumina matrix materials and combinations thereof. Ceramic fibers may be embedded within the matrix, such as oxidation stable reinforcing fibers including monofilaments like sapphire and silicon carbide (e.g., Textron's SCS-6™), as well as roving and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape. Additionally, or alternatively, the CMC material may be formed in any other suitable manner or using any other suitable materials.

Referring still to FIG. 3, and as is discussed above and further below, the combustion gases 66 flow from the combustion chamber 114 into and through the turbine section of the propulsion system 10, where a portion of thermal and/or kinetic energy from the combustion gases 66 is extracted via sequential stages of turbine stator vanes and turbine rotor blades within the HP turbine 28 and LP turbine 30. More specifically, as is depicted in FIG. 3, combustion gases 66 from the combustion chamber 114 flow into the HP turbine 28, located immediately downstream of the combustion chamber 114, where thermal and/or kinetic energy from the combustion gases 66 is extracted via sequential stages of HP turbine stator vanes 68 and HP turbine rotor blades 70.

As is also discussed above with reference to FIG. 2, the HP turbine 28 is coupled to the HP compressor 24 via the HP shaft 34 to form a HP spool or HP rotor operable to maximum speeds generally higher than an LP spool formed by the LP compressor 22, the LP turbine 30, the LP shaft 36, and the fan section 14. Accordingly, rotation of the plurality of stages of HP turbine rotor blades 70 correspondingly rotates a plurality of stages of HP compressor rotor blades 80.

The exemplary propulsion system 10 of FIGS. 2-3 are configured to be operated in order to maintain a temperature of the HP turbine 28 below a maximum operating temperature for the various components therein, with decreased cooling flow extracted from the compressor section. In a particular embodiment, the HP turbine includes one or more stages of blades formed as a substantially solid, impermeable at the airfoil at the core flowpath. In other embodiments, the HP turbine includes one or more stages of blades configured for decreased cooling flow therethrough, such as to improve engine efficiency by reducing or eliminating an amount of air removed from the thermodynamic cycle (i.e., air removed from combustion) via reducing or eliminating cooling flow from the compressor section to the HP turbine.

Referring back to FIG. 3, the turbine section includes an inter-turbine frame 300 positioned between the HP turbine 28 and the LP turbine 30. The frame 300 is configured as a stationary, static support structure configured to support one or both of the HP turbine 28 or the LP turbine 30. The frame 300 includes an inter-turbine burner 310 configured to allow a flow of gaseous fuel into the core flowpath upstream of the LP turbine. The frame forms the burner at a vane or strut 312 of the frame and one or more orifices or openings 306 configured to allow the flow of gaseous fuel 362 through the strut 312 into the core flowpath.

In various embodiments, the inter-turbine burner 310 forms a second fuel conduit configured to deliver the gaseous fuel 362 to the core flowpath. In a particular embodiment, the burner 310 is formed as a flameholder at the strut 312 of the frame 300, in contrast to a combustion system such as formed at the combustion section. In certain embodiments, the inter-turbine burner includes struts or vanes formed as airfoils and/or structural members, such as generally provided for inter-turbine frames, midframe structures, or other support frames. The strut 312 includes a forward or leading edge 304 and an aft or trailing edge 302. The struts 312 include hollow portions to allow for fluid flow therethrough. In certain embodiments, the frame 300 includes a lubricant conduit 316 and an air conduit 314 such as generally provided for lubricants or air for a bearing assembly 320. The inter-turbine frame 300 may further include a conduit 308 configured to egress a flow of gaseous fuel 362 through the orifice 306 at the strut 312. In a particular embodiment, the orifice 306 is positioned at the trailing edge 302 of the strut 312, such as to allow the gaseous fuel to flow therethrough and aft toward the LP turbine 30.

The combustion section 26 is configured as a deflagrative or detonative combustion section. A flow of liquid fuel 352 is provided to the combustion section 26 through one or more fuel nozzles 124. The flow of liquid fuel 352 is mixed with compressed air from the compressor section then burned to generate combustion gases 66. The liquid fuel 352 provided to the combustion section 26 is a liquid jet fuel or aviation turbine fuel, such as a kerosene-based fuel, naphtha-type fuels, or equivalent (e.g., Jet-A, Jet-B, Jet Propellant (JP8), biofuels, synthetic fuels, or other appropriate aviation fuel). The gaseous fuel 362 provided to the inter-turbine burner is a gaseous fuel, such as hydrogen gas (H2), natural gas, methane, synthesis gas, or other appropriate type of gaseous fuel. The flow of gaseous fuel 362 released through the inter-turbine burner 310 between the HP turbine 28 and the LP turbine 30 is mixed with the flow of combustion gases 66.

It should be appreciated that the gaseous fuel 362 has a gaseous fuel ignition temperature (i.e., a second ignition temperature) less than a liquid fuel ignition temperature (i.e., a first ignition temperature) of the liquid fuel 352. The gaseous fuel 362 further has a gaseous fuel burning velocity (i.e., a second burning velocity) greater than a liquid fuel burning velocity (i.e., a first burning velocity) of the liquid fuel 352. The relatively lower second ignition temperature limit allows the mixture of gaseous fuel 362 from the inter-turbine burner 310 and the combustion gases 66 from the combustion section 26 to generate the second combustion gases with the relatively high-speed flow of fluid through the turbine section. The second combustion gases produced by the inter-turbine burner 310 may further have a flame speed greater than that of the first combustion gases produced by the combustion section 26.

In certain embodiments, the gaseous fuel 362 has an upper flammability limit greater than the liquid fuel. In still certain embodiments, additionally, the range of the flammability limit is generally greater than that of the liquid fuel. In certain embodiments, the lower flammability limit of the gaseous fuel is lower than the upper flammability limit of the liquid fuel. Still further, the gaseous fuel has a higher degree or magnitude of flammability than the liquid fuel. Accordingly, the mixture of gaseous fuel and combustion gases may burn without external ignition (e.g., with an igniter or other energy input), unlike afterburner systems utilizing liquid fuel.

The aircraft 100 and propulsion system 10, separately or together, include a first fuel system 350 for flowing and distributing the liquid fuel 352 at the combustion section 26 and a second fuel system 360 for flowing and distributing the gaseous fuel 362 at the inter-turbine burner 310. It should be appreciated that the first fuel system 350 may further be configured to provide the liquid fuel 352 as an actuation fluid and/or a heat exchange fluid (e.g., to receive heat or thermal energy from another fluid or surface), in contrast to the second fuel system 360. More particularly, the first fuel system 350 may be configured to provide actuation force or pressure to modulate one or more valves, actuators, doors, openings, nozzles, flow devices, or adjustable areas at the propulsion system, such as variable area nozzles, bleed valves, exhaust nozzles, active clearance control valves or doors, transient or start bleed valves, or other actuatable portion of the propulsion system or aircraft.

Embodiments of the aircraft 100 and propulsion system 10 depicted and described herein may provide improved propulsion system and aircraft efficiency, emissions, or fuel burn. The inter-turbine burner 310 can increase LP turbine 30 power extraction over a given high pressure (HP) spool or core engine size (i.e., the HP compressor 24, the combustion section 26, and the HP turbine 38). The second fuel system 360 configured to provide gaseous fuel 362 to the inter-turbine burner 310 separate from the first fuel system 350 configured to provide liquid fuel 352 to the combustion section 26 allows for increased LP turbine power extraction and power output greater than the power output from the core engine alone.

It should be appreciated that, although described as an inter-turbine burner between an HP turbine and an LP turbine, various embodiments provided herein may include the inter-turbine burner between a first turbine receiving higher pressure combustion gases and a second turbine receiving lower pressure combustion gases. As such, various embodiments may include an intermediate pressure (IP) turbine generally positioned between the HP turbine and the LP turbine. Particular embodiments may position the inter-turbine burner described herein between the HP turbine and the IP turbine, or between the IP turbine and the LP turbine.

Still further, although depicted as a conventional turbine rotor, embodiments of the HP turbine or LP turbine provided herein may be configured as interdigitated or vaneless turbine assemblies.

Embodiments of the aircraft 100 and propulsion system 10 provided herein allow for sizing and operating the core engine at a steady-state speed and power output particularly for hybrid-electric propulsion systems and/or obviating power generation from a separate auxiliary power unit (APU). In certain embodiments, the propulsion system 10 is configured to generate a work-split between the core engine including the high pressure (HP) spool and combustion section versus the low pressure (LP) spool including the inter-turbine burner. In various embodiments, the propulsion system 10 has a rated power output ratio of the core engine and the inter-turbine burner 310 with the LP spool (i.e., the LP turbine 30, the LP compressor 22, and the fan section 14) between 1.5 and 5.7. In certain embodiments, the propulsion system is configured to generate an 85/15 work-split between the core engine and the LP spool. Stated differently, the core engine is configured to operate the HP spool at a maximum rotational speed corresponding to 85% of the rated power output of the propulsion system 10. The propulsion system 10 is further configured to generate up to 15% of the rated power output of the propulsion system via the LP spool and inter-turbine burner using the gaseous fuel and combustion gases generated from the core engine. Such ratios may allow for substantially reduced heat loads from the combustion section 26 imparted onto the downstream turbine components, which may allow for improved durability and reduced cooling flow, which may improve overall propulsion system efficiency.

In another embodiment, the propulsion system is configured to generate an 80/20 work-split between the core engine and the LP spool and the inter-turbine burner. In still another embodiment, the propulsion system is configured to generate a 75/25 work-split between the core engine and the LP spool and the inter-turbine burner. In still yet another embodiment, the propulsion system is configured to generate a 60/40 work-split between the core engine and the LP spool and the inter-turbine burner. In still various embodiments, the propulsion system is configured to generate between 60% and 85% of the maximum power output through combustion gases generated via the core engine, and the remainder via the LP spool and inter-turbine burner using the gaseous fuel and combustion gases generated from the core engine.

In various embodiments, the work-split is between a low-power output versus a remaining difference from the maximum power output. Stated differently, the work-split is a limit between a low-power output operating condition, above which (via the inter-turbine burner and flow of gaseous fuel) the operating condition is a high-power output condition. In certain embodiments, the maximum power output is particularly a rated power output with reference to a maximum rotational speed of the propulsion system while operating properly. For example, the propulsion system may be operating at the rated speed or rated power output during maximum load operations, such as during takeoff operation with regard to a landing-takeoff (LTO) cycle. In certain embodiments, the limit or delineation of the work-split (e.g., 60%-85% generally, such as 85%, or 80%, or 75%, or 60%) of the maximum power output corresponds to a cruise or descent operation of the propulsion system and aircraft relative to the LTO cycle versus a difference from the rated power output of the propulsion system. As such, certain embodiments of the propulsion system are configured for maximum rotational speed from operation of only first fuel system providing the liquid fuel (i.e., without operation of the inter-turbine burner) to the core engine corresponding to a cruise condition. In still certain embodiments, the propulsion system is configured for maximum power output or rated power output from operation of both of the combustion section with the first fuel system and the inter-turbine burner with the second fuel system.

It should be appreciated that those skilled in the art understand that ranges and ratios of work-split provided herein correspond to particular structures and sizes of the core engine, inter-turbine burner, and the LP spool. Typical aircraft gas turbine propulsion engines are designed, sized, and structured to generate 100% of the maximum power output via combustion gases generated at the combustion section and extracted via the LP spool. Certain aircraft gas turbine propulsion engines utilize afterburner or reheat systems configured to utilize a portion of the liquid fuel, typically directed to a main burner at the combustion section, and mixed with combustion gases downstream of the main burner to further generate thrust (i.e., afterburner). However, such typical afterburning systems are generally unsuitable for commercial aircraft or other aircraft restricted by emissions output. Additionally, such systems utilizing liquid fuel are generally complex, having an igniter system and complications related to the lower flammability of liquid fuel. Such systems may generally produce levels of emissions, smoke, or noise that may prohibit utilization with commercial aircraft.

Referring back to FIG. 2, the propulsion system 10 may further include a computing system 210 configured to operate the propulsion system 10 such as described herein. The computing system 210 can correspond to any suitable processor-based device, including one or more computing devices, such as described above. In certain embodiments, the computing system 210 is a full-authority digital engine controller (FADEC) for a gas turbine engine, or other computing module or controller configured to execute instructions for operating a gas turbine engine. For instance, FIG. 6 illustrates one embodiment of suitable components that can be included within the computing system 210. The computing system 210 can include a processor 212 and associated memory 214 configured to perform a variety of computer-implemented functions.

As shown, the computing system 210 can include control logic 216 stored in memory 214. The control logic 216 may include instructions that when executed by the one or more processors 212 cause the one or more processors 212 to perform operations. Additionally, the computing system 210 can also include a communications interface module 230. In several embodiments, the communications interface module 230 can include associated electronic circuitry that is used to send and receive data. As such, the communications interface module 230 of the computing system 210 can be used to send and/or receive data to/from propulsion system 10. In addition, the communications interface module 230 can also be used to communicate with any other suitable components of the propulsion system 10, such as described herein.

It should be appreciated that the communications interface module 230 can be any combination of suitable wired and/or wireless communications interfaces and, thus, can be communicatively coupled to one or more components of the power generation system via a wired and/or wireless connection or distributed network. The communications interface module 230 can include any suitable wired and/or wireless communication links for transmission of the communications and/or data, as described herein. For instance, the module 230 can include a SATCOM network, ACARS network, ARINC network, SITA network, AVICOM network, a VHF network, a HF network, a Wi-Fi network, a WiMAX network, a gatelink network, etc.

A method for operating a propulsion system for an aircraft is provided (hereinafter "method 1000"). The method may be executed with an aircraft and propulsion system such as described above, or other appropriate system. In particular embodiments, the method 1000 is executable with the computing system 210 of the propulsion system 10 or aircraft 100, such as a computer-implemented method. It should be appreciated that the computing system 210 and the method 1000 provided herein may allow for improved propulsive efficiency, decreased emissions output, and overall improvement in engine and aircraft operation. Certain embodiments may provide benefits particular to propulsion systems and aircraft under restrictions with regard to emissions output, noise, or thrust.

The method 1000 includes at 1010 flowing liquid fuel to a combustion section of the propulsion system. The method 1000 at 1020 includes generating first combustion gases at the combustion section corresponding to 85% or less of a rated power output of the propulsion system. The method 1000 at 1030 includes modulating rotational speed of the LP spool via modulating a flow of gaseous fuel to an inter-turbine burner to generate second combustion gases, such as depicted and described herein.

In various embodiments, the method 1000 includes at 1022 operating a core engine and a low pressure (LP) spool with an inter-turbine burner at a rated power output ratio of the core engine and the inter-turbine burner with the LP spool between 1.5 and 5.7, such as described above. In a particular embodiment, the method 1000 includes at 1024 operating a high pressure (HP) spool at a maximum rotational speed corresponding to between 60% and 85% of the rated power output of the propulsion system. The method 1000 at 1026 includes flowing gaseous fuel to the inter-turbine burner to generate the rated power output of the propulsion system. As such, the method 1000 may have the engine operate at a substantially steady-state operating condition via the flow of liquid fuel up to 60% to 85% of the rated power output, and the method 1000 may have the engine modulate the flow of gaseous fuel to generate the remainder of the rated power output, or portions thereof.

In certain embodiments, the method 1000 includes at 1040 operating a high pressure (HP) spool at a steady-state rotational speed while modulating the flow of gaseous fuel to the inter-turbine burner. In certain embodiments, the operations include at 1042 receiving a control signal corresponding to a high-power operating mode of the propulsion system. In some embodiments, receiving the control signal corresponding to the high-power operating mode includes a rated power operation or takeoff operating mode of the propulsion system. In other embodiments, the high-power operating mode corresponds to a climb, descent or approach, or takeoff condition relative to the LTO cycle. The method 1000 at 1044 includes flowing gaseous fuel to the inter-turbine burner to generate the second combustion gases corresponding to a difference between the rated power output of the propulsion system and a power output generated by flowing liquid fuel to the combustion section.

In another embodiment, the method 1000 includes at 1046 receiving a control signal corresponding to a low-power operating mode of the propulsion system. In a particular embodiment, the low-power operating mode corresponds to a cruise condition relative to the LTO cycle. The method 1000 at 1048 includes decreasing the flow of gaseous fuel to the inter-turbine burner to decrease the power output of the propulsion system. In a particular embodiment, the method 1000 at 1050 includes operating a high pressure (HP) spool at a steady-state rotational speed while decreasing the flow of gaseous fuel to the inter-turbine burner. In a still particular embodiment, decreasing the flow of gaseous fuel to the inter-turbine burner to decrease the power output of the propulsion system corresponds to changing the operating mode of the propulsion system from a high-power operating mode to a low-power operating mode.

It should be appreciated that those skilled in the art will understand the elapsed time and tolerances, ranges, or deviations of a given speed or power output corresponding to "steady-state" operating condition. In particular embodiments, those skilled in the art will understand "steady-state" within the context of aviation propulsion systems. In still particular embodiments, those skilled in the art will understand "steady-state", speeds, or power outputs provided herein within the context of a landing-takeoff cycle for an aircraft.

It should be appreciated that embodiments of the propulsion system 10, aircraft 100, and method 1000 provided herein include combinations of elements, subsystems, arrangements, and configurations that provide unexpected benefits over known elements separately or in known arrangements and configurations. For instance, it should be appreciated that having separate fuel systems and methods for control, such as via the first fuel system 350 and the second fuel system 360, and the method 1000 provided herein, introduces elements that prior to now may be perceived as additionally complicated or complex, such as to discourage implementation into certain propulsion systems and aircraft, such as commercial or general aviation aircraft. However, as provided herein, the present disclosure describes systems, methods, and particular combinations or arrangements that provide unexpected benefits outweighing complexities associated with separate fuel systems.

Such benefits include allowing substantially steady-state rotational speed or operation of the HP spool while increasing and decreasing power output of the propulsion system. Such benefit may allow for operating one or more propulsion systems of the aircraft to generate electric power to aircraft subsystems while at idle operating conditions, runway taxiing or gate-side operation, or other instances at which known aircraft propulsion systems may not operate due to higher fuel consumption in contrast to using an auxiliary power unit (APU) to generate electric energy for an aircraft or other propulsion systems. As such, embodiments of the propulsion system and engine provided herein may obviate the need or desire for an APU in an aircraft, such as to reduce aircraft weight and improve aircraft efficiency.

Such benefits may also include allowing the core engine to be a smaller size and less fuel consumption to generate the rated power output of a known propulsion system with a relatively larger core engine. Embodiments provided herein allow for the core engine of the propulsion system to perform operations more typical of APUs and unlike those typically performed for aircraft propulsion systems. Additionally, embodiments provided herein allow for improved emissions output over known propulsion systems, such as via the reduced core engine size and the improved emissions output from gaseous fuel to generate rated power output at particular engine operating conditions. Still further, by providing for the second fuel system 360 and method 1000 for operation at particular operating conditions, issues related to gaseous fuel are mitigated in contrast to utilizing gaseous fuel for substantially all operating conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. An aircraft propulsion system, the propulsion system including a low pressure (LP) spool comprising a fan section, a LP compressor, and an LP turbine; a core engine comprising a high pressure (HP) compressor, a combustion section, and an HP turbine, wherein the HP compressor and the HP turbine together form a rotatable HP spool; a frame positioned in serial flow arrangement between the HP turbine and the LP turbine, wherein the frame comprises an inter-turbine burner comprising a strut forming an outlet opening into a core flowpath of the propulsion system; a first fuel system comprising a first fuel conduit in fluid communication with a fuel nozzle at the combustion section, wherein the first fuel system is configured to flow a liquid fuel to the combustion section for generating first combustion gases; a second fuel system comprising a second fuel conduit in fluid communication with the core flowpath via the outlet opening at the inter-turbine burner, wherein the second fuel system is configured to flow a gaseous fuel to the core flowpath for generating second combustion gases; wherein the LP compressor, the HP compressor, the combustion section, the HP turbine, the inter-turbine burner, and the LP turbine are in serial flow arrangement; and wherein the propulsion system comprises a rated power output ratio of the core engine and the inter-turbine burner with the LP spool between 1.5 and 5.7.

2. The propulsion system of any one or more clauses herein, wherein the core engine is configured to operate the HP spool at a maximum rotational speed corresponding to between 60% and 85% of the rated power output of the propulsion system.

3. The propulsion system of any one or more clauses herein, the propulsion system comprising a computing system comprising a processor and memory, wherein the memory is configured to store instructions that, when executed by the processor, cause the propulsion system to perform operations, the operations comprising flowing liquid fuel to the combustion section then generating first combustion gases at the combustion section corresponding to 85% or less of the rated power output of the propulsion system.
4. The propulsion system of any one or more clauses herein, the operations comprising modulating rotational speed of the LP spool via modulating the flow of gaseous fuel to the inter-turbine burner to generate the second combustion gases.
5. The propulsion system of any one or more clauses herein, the operations comprising operating the HP spool at a steady-state rotational speed while modulating the flow of gaseous fuel to the inter-turbine burner.
6. The propulsion system of any one or more clauses herein, the operations comprising modulating a flow of gaseous fuel through the inter-turbine burner to alter an output power of the propulsion system.
7. The propulsion system of any one or more clauses herein, the operations comprising maintaining a steady-state rotational speed of the HP spool when modulating the flow of gaseous fuel.
8. The propulsion system of any one or more clauses herein, the operations comprising receiving a control signal corresponding to a high-power operating mode of the propulsion system; then flowing gaseous fuel to the inter-turbine burner to generate the second combustion gases corresponding to a difference between the rated power output of the propulsion system and a power output generated by flowing liquid fuel to the combustion section.
9. The propulsion system of any one or more clauses herein, the operations comprising receiving a control signal corresponding to a low-power operating mode of the propulsion system; then decreasing the flow of gaseous fuel to the inter-turbine burner to decrease the power output of the propulsion system.
10. The propulsion system of any one or more clauses herein, the operations comprising operating the HP spool at a steady-state rotational speed while decreasing the flow of gaseous fuel to the inter-turbine burner.
11. The propulsion system of any one or more clauses herein, wherein the fan section is configured as an unducted open rotor.
12. The propulsion system of any one or more clauses herein, the propulsion system comprising an electric machine operably coupled to the HP spool.
13. A computing system for an aircraft propulsion system, the computing system comprising one or more processors and one or more memory, wherein the memory is configured to store instructions that, when executed by the processor, cause the propulsion system to perform operations, the operations comprising flowing liquid fuel to a combustion section of the propulsion system; generating first combustion gases at the combustion section corresponding to 85% or less of a rated power output of the propulsion system; and modulating rotational speed of the LP spool via modulating a flow of gaseous fuel to an inter-turbine burner to generate second combustion gases.
14. The computing system of any one or more clauses herein, the operations comprising operating a high pressure (HP) spool at a steady-state rotational speed while modulating the flow of gaseous fuel to the inter-turbine burner.
15. The computing system of any one or more clauses herein, the operations comprising the operations comprising receiving a control signal corresponding to a high-power operating mode of the propulsion system; and flowing gaseous fuel to the inter-turbine burner to generate the second combustion gases corresponding to a difference between the rated power output of the propulsion system and a power output generated by flowing liquid fuel to the combustion section.
16. The computing system of any one or more clauses herein, the operations comprising receiving a control signal corresponding to a low-power operating mode of the propulsion system; and decreasing the flow of gaseous fuel to the inter-turbine burner to decrease the power output of the propulsion system.
17. The computing system of any one or more clauses herein, the operations comprising operating a high pressure (HP) spool at a steady-state rotational speed while decreasing the flow of gaseous fuel to the inter-turbine burner.
18. The computing system of any one or more clauses herein, the operations comprising operating a core engine and a low pressure (LP) spool with an inter-turbine burner at a rated power output ratio of the core engine and the inter-turbine burner with the LP spool between 1.5 and 5.7.
19. The computing system of any one or more clauses herein, the operations comprising operating a high pressure (HP) spool at a maximum rotational speed corresponding to between 60% and 85% of the rated power output of the propulsion system.
20. The computing system of any one or more clauses herein, the operations comprising flowing gaseous fuel to the inter-turbine burner to generate the rated power output of the propulsion system.
21. The propulsion system of any one or more clauses herein, comprising the computing system of any one or more clauses herein.
22. The computing system of any one or more clauses herein, configured to operate the propulsion system of any one or more clauses herein.
23. An aircraft comprising the propulsion system of any one or more clauses herein.
24. An aircraft comprising the computing system of any one or more clauses herein.

What is claimed is:

1. An aircraft propulsion system, the propulsion system comprising:
a low pressure (LP) spool comprising a fan section, a LP compressor, and an LP turbine;
a core engine comprising a high pressure (HP) compressor, a combustion section, and an HP turbine, wherein the HP compressor and the HP turbine together form a rotatable HP spool;
a frame positioned in serial flow arrangement between the HP turbine and the LP turbine, wherein the frame comprises a strut defining an inter-turbine burner, the inter-turbine burner comprising an outlet opening defined along a trailing edge of the strut, wherein the outlet opening is in fluid communication with a core flowpath of the propulsion system;
a first fuel system comprising a first conduit in fluid communication with a fuel nozzle at the combustion section, wherein the first fuel system is configured to flow a liquid fuel to the combustion section for generating first combustion gases;
a second fuel system comprising a second conduit in fluid communication with the core flowpath via the outlet opening at the inter-turbine burner, wherein the second fuel system is configured to flow a gaseous fuel to the core flowpath downstream from the HP turbine for generating second combustion gases;

wherein the LP compressor, the HP compressor, the combustion section, the HP turbine, the inter-turbine burner, and the LP turbine are in serial flow arrangement; and wherein the propulsion system comprises a rated power output ratio of the core engine and the inter-turbine burner with the LP spool between 1.5 and 5.7.

2. The propulsion system of claim 1, wherein the core engine is configured to operate the HP spool at a maximum rotational speed corresponding to between 60% and 85% of a rated power output of the propulsion system.

3. The propulsion system of claim 1, the propulsion system further comprising:

a computing system comprising a processor and memory, wherein the memory is configured to store instructions that, when executed by the processor, cause the propulsion system to perform operations, the operations comprising:

flowing the liquid fuel to the combustion section then generating the first combustion gases at the combustion section corresponding to 85% or less of a rated power output of the propulsion system.

4. The propulsion system of claim 3, the operations further comprising:

modulating rotational speed of the LP spool via modulating the flow of the gaseous fuel to the inter-turbine burner to generate the second combustion gases.

5. The propulsion system of claim 4, the operations further comprising:

operating the HP spool at a steady-state rotational speed while modulating the flow of gaseous fuel to the inter-turbine burner.

6. The propulsion system of claim 3, the operations further comprising:

modulating the flow of the gaseous fuel through the inter-turbine burner to alter a power output of the propulsion system.

7. The propulsion system of claim 6, the operations further comprising:

maintaining a steady-state rotational speed of the HP spool when modulating the flow of gaseous fuel.

8. The propulsion system of claim 3, the operations further comprising:

receiving a control signal corresponding to a high-power operating mode of the propulsion system; then flowing the gaseous fuel to the inter-turbine burner to generate the second combustion gases corresponding to a difference between the rated power output of the propulsion system and a power output generated by flowing the liquid fuel to the combustion section.

9. The propulsion system of claim 3, the operations further comprising:

receiving a control signal corresponding to a low-power operating mode of the propulsion system; then decreasing the flow of the gaseous fuel to the inter-turbine burner to decrease the power output of the propulsion system.

10. The propulsion system of claim 9, the operations further comprising:

operating the HP spool at a steady-state rotational speed while decreasing the flow of the gaseous fuel to the inter-turbine burner.

11. The propulsion system of claim 1, the propulsion system further comprising:

an electric machine operably coupled to the HP spool.

12. The propulsion system of claim 1, wherein the gaseous fuel combusts within the frame.

13. A computing system for an aircraft propulsion system, the computing system comprising one or more processors and one or more memory, wherein the memory is configured to store instructions that, when executed by the processor, cause the propulsion system to perform operations, the operations comprising:

flowing liquid fuel to a combustion section of the propulsion system;

generating first combustion gases at the combustion section corresponding to 85% or less of a rated power output of the propulsion system; and modulating rotational speed of a low pressure (LP) spool including a LP turbine via modulating a flow of gaseous fuel to an inter-turbine burner defined by a frame strut disposed upstream from the LP turbine and downstream from a high pressure (HP) turbine to generate second combustion gases, wherein the flow of gaseous fuel flows from an outlet opening of the inter-turbine burner, wherein the outlet opening is defined along a trailing edge of the strut, and wherein the outlet opening is disposed upstream of the LP spool.

14. The computing system of claim 13, the operations further comprising:

operating a HP spool at a steady-state rotational speed while modulating the flow of the gaseous fuel to the inter-turbine burner.

15. The computing system of claim 13, the operations further comprising:

receiving a control signal corresponding to a high-power operating mode of the propulsion system; and flowing the gaseous fuel to the inter-turbine burner to generate the second combustion gases corresponding to a difference between the rated power output of the propulsion system and a power output generated by flowing the liquid fuel to the combustion section.

16. The computing system of claim 13, the operations further comprising:

receiving a control signal corresponding to a low-power operating mode of the propulsion system; and decreasing the flow of the gaseous fuel to the inter-turbine burner to decrease a power output of the propulsion system.

17. The computing system of claim 16, the operations further comprising:

operating a HP spool at a steady-state rotational speed while decreasing the flow of gaseous fuel to the inter-turbine burner.

18. The computing system of claim 13, the operations further comprising:

operating a core engine and the LP spool with the inter-turbine burner at a rated power output ratio of the core engine and the inter-turbine burner with the LP spool between 1.5 and 5.7.

19. The computing system of claim 18, the operations further comprising:

operating a HP spool at a maximum rotational speed corresponding to between 60% and 85% of the rated power output of the propulsion system.

20. The computing system of claim 19, the operations further comprising:

flowing the gaseous fuel to the inter-turbine burner to generate the rated power output of the propulsion system.

* * * * *